United States Patent [19]

Wolak

[11] Patent Number: 4,519,830

[45] Date of Patent: May 28, 1985

[54] TEMPERATURE SENSING STRUCTURE FOR A FURNACE

[75] Inventor: Ronald G. Wolak, Dearborn, Mich.

[73] Assignee: Ford Motor Company, Dearborn, Mich.

[21] Appl. No.: 603,866

[22] Filed: Apr. 25, 1984

[51] Int. Cl.³ .............................................. C03B 5/24
[52] U.S. Cl. ..................................... 65/162; 136/230; 136/242
[58] Field of Search .................. 65/162; 136/230, 242

[56] References Cited

U.S. PATENT DOCUMENTS

| | | | |
|---|---|---|---|
| 2,120,452 | 6/1938 | Amsler | 65/162 |
| 2,579,108 | 12/1951 | Bock et al. | 136/242 X |
| 3,123,344 | 3/1964 | Ross | 65/107 X |
| 3,479,172 | 11/1969 | McCown et al. | 65/118 |

FOREIGN PATENT DOCUMENTS 579817  7/1959  Canada ..................... 136/230

*Primary Examiner*—Arthur Kellogg
*Attorney, Agent, or Firm*—William E. Johnson; Olin B. Johnson

[57] ABSTRACT

An improved temperature sensing structure (40) for use in a glass bending furnace (10) is made of the following. A thermocouple element (42) is provided which has a pair of thermocouple leads (44) and (46) terminating in a junction (48) which defines a planar loop portion of the thermocouple element. Mounting structure (50) is provided for mounting the pair of thermocouple leads with the planar loop portion thereof projecting outwardly from a free end. A protection tube has an elongated portion (54) in surrounding relationship to the mounting structure which mounts the pair of thermocouple leads and a free end portion (56) which in part surrounds a significant portion of the planar loop portion of the thermocouple element. The surrounding part of the free end portion of the protection tube is positioned so that the planar loop portion of the thermocouple element lies in a plane in facing relationship to an unsurrounding part of the free end portion of the protection tube. A quartz tube (62) encloses the planar loop portion of the thermocouple element. The protection tube is positioned in the wall structure of the glass bending furnace so that the unsurrounding part of the free end portion of the protection tube is in a facing relationship with a radiant heat generating device whereby the planar loop portion of the thermocouple element, which is protected by the quartz tube, can give an accurate reading of the radiation being given off by the radiant heat generating device in facing relationship thereto.

3 Claims, 5 Drawing Figures

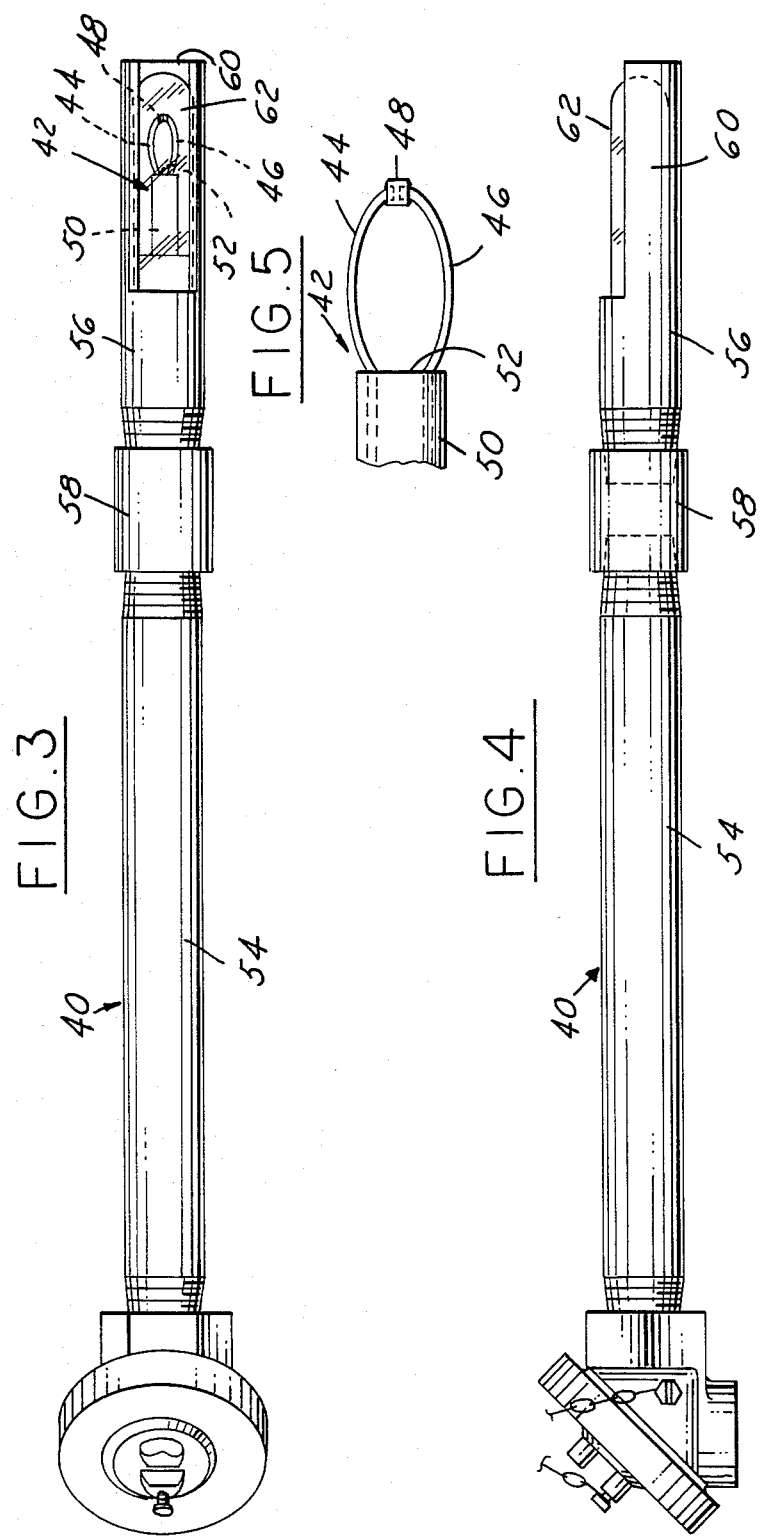

TEMPERATURE SENSING STRUCTURE FOR A FURNACE

TECHNICAL FIELD

This application is directed to an improved temperature sensing structure which finds principal use as a temperature sensing structure in a glass bending furnace. The glass bending furnace is one which has wall structures in which radiant heat generating devices passing therethrough are used to generate heat within the interior of the glass bending furnace.

BACKGROUND AND PRIOR ART STATEMENT

The prior art is well aware of the use of simple thermocouple structures in glass bending furnaces for the purpose of controlling the temperature within the furnace. Such thermocouple structures are normally inserted in the glass bending furnace through the roof or the side wall of the furnace to provide a temperature control signal. The temperature control signal is processed by other control equipment in order to control radiant heat generating devices within the furnace which supply heat to the furnace.

The thermocouple structures of the prior art, however, are affected by a number of different conditions within the glass bending furnace and thus do not generally accurately indicate the heat which is being generated by the radiant heat generating devices for heating the interior of the glass bending furnace. For example, the following conditions within the glass bending furnace can affect the temperature reported by the prior art thermocouple structures. Randomly generated air currents which result because of temperature differences between different portions of the glass bending furnace cause deviation in temperature readings by the prior art thermocouples. Bending fixtures passing through the glass bending furnace without any glass supported thereon can affect the temperature conditions within the bending furnace and can cause some inaccuracy in the temperature read by the prior art thermocouples. Other processing conditions such as extensive gaps between bending fixtures, dummy bending fixtures between actual bending fixtures, and varying glass and fixture sizes for glass bending fixtures being processed through the glass bending furnace can also affect the readings taken by the prior art thermocouples. Similarly, thermocouples of the prior art type can be affected both by fluctuations in gas burner pressure if gas burners are used as the radiant heat generating devices and by radiant reflection from the glass surfaces of the glass being carried on the bending fixtures.

I set out to design a temperature sensing structure for a glass bending furnace which would accurately detect the radiant energy being generated for heating the interior of the glass bending furnace by a radiant heat generating device. The temperature sensing structure that I wanted to design was one that would not be adversely affected by the changing air currents within the glass bending furnace and by movement of empty bending fixtures, large gaps between bending fixtures, dummy bending fixtures, as well as varying glass and fixture size. I also intended to design an improved temperature sensing structure for a glass bending furnace which would not be adversely affected by fluctuating burner gas pressure when gas burners were used as the radiant heat generating devices or by radiant reflection from glass surfaces passing therethrough.

A search was conducted on the subject matter of this application in the U.S. Patent and Trademark Office. As a result of that search, the following U.S. patents were cited: U.S. Pat. Nos. 2,120,452; 3,123,344; and 3,479,172.

While I believe none of the cited patents teach the improved temperature sensing structure of my invention, I will briefly discuss the cited patents below.

U.S. Pat. No. 2,120,452, issued on June 14, 1938, for an "Annealing Lehr." This patent shows an annealing lehr which includes a thermostatic controlling device for automatically maintaining a predetermined temperature for the gases which enter the lehr for heating purposes. In this patent the thermostatic controlling device is identified by the numeral 35. The patent indicates that this device operates an arm 36 connected to an adjustable link 37 and thence to an arm 38 which controls a valve 39 supplying fuel from a pipe 40 to a burner 20. No details are given of the exact makeup of the controlling device 35.

U.S. Pat. No. 3,123,344, issued on March 3, 1964, for "Glass Bending Furnaces." The glass bending furnace shown is of the type generally used today. However, the patent shows only the use of simple thermocouples 42 to detect the temperature within the glass bending furnace. No detailed discussion is made of the exact makeup of the thermocouples 42 other than to indicate that they are thermocouple elements of the type known at the time that glass bending furnace construction was patented.

U.S. Pat. No. 3,479,172, issued on Nov. 18, 1969, for an "Apparatus for Controlling Glass Temperatures." This patent discloses a device for measuring the temperature of a glass sheet as it is conveyed through a lehr or glass bending furnace. A radiation pyrometer is reciprocated transversely of a sheet of glass passing through the bending furnace along a path parallel to and spaced from the sheet of glass. The purpose of using such a traversing radiation pyrometer is to sense directly the temperature of the glass and to transmit the observed temperature profile to conventional recording and temperature control apparatus.

DISCLOSURE OF THE INVENTION

This invention relates to an improved temperature sensing structure and more particularly to an improved temperature sensing structure for use in a glass bending furnace.

In accordance with the details of the teachings of my invention, an improved temperature sensing structure is disclosed. This improved temperature sensing structure is used in a glass bending furnace having wall structures in which radiant heat generating devices pass therethrough. The radiant heat generating devices passing through the wall structure of the glass bending furnace are used to generate heat for heating the interior of the glass bending furnace. The improved temperature sensing structure of my invention has the following structure.

A thermocouple element is provided. This thermocouple element has a pair of thermocouple leads which terminate in a junction end. This junction end terminating the pair of thermocouple leads defines a planar loop portion of the thermocouple element. Mounting structure is provided for mounting the pair of thermocouple leads with the planar loop portion thereof projecting outwardly from a free end of the mounting structure.

A radiation reflective, heat shielding protection tube is provided. The protection tube has two basic portions. The first basic portion of the protection tube is an elongated portion which is in surrounding relation to the mounting structure which mounts the pair of thermocouple leads. The protection tube also has a free end portion which surrounds all but a facing portion of the planar loop portion of the thermocouple element. The surrounding part of the free end portion of the protection tube is positioned so that the facing planar loop portion of the thermocouple element lies in a plane in facing relationship to an unsurrounding part of the free end portion of the protection tube. In this manner one face of the planar loop portion of the thermocouple element is unprotected by an unsurrounding part of the free end portion of the protection tube.

A quartz tube encloses the planar loop portion of the thermocouple element. The quartz tube is generally opaque to infrared wavelengths longer than about 7 microns and transparent to shorter wavelengths. The quartz tube protects the face of the planar loop portion of the thermocouple element which faces the unsurrounding part of the free end portion of the protection tube.

Positioning structure is provided for positioning the protection tube in a wall structure of the glass bending furnace. The protection tube is so positioned that the unsurrounding part of the free end of the protection tube is in a facing relationship with a radiant heat generating device passing through a wall structure of the glass bending structure. In such a manner a planar portion of the thermocouple element which faces the unsurrounding part of the free end of the protection tube and is protected by the quartz tube can be in direct facing relationship with the radiant heat generating device. In this manner the planar loop portion of the thermocouple element protected by the quartz tube can give an accurate reading of the radiation being given off by the radiant heat generating device in facing relationship thereto.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 3 is a plan view of an improved temperature sensing structure in accordance with the teachings of this invention;

FIG. 4 is a side elevation view of the improved temperature sensing structure of FIG. 3; and FIG. 5 is an enlarged plan view of a junction end of a thermocouple element of the improved temperature sensing structure of this invention.

BEST MODE AND INDUSTRIAL APPLICABILITY

Figure 1:
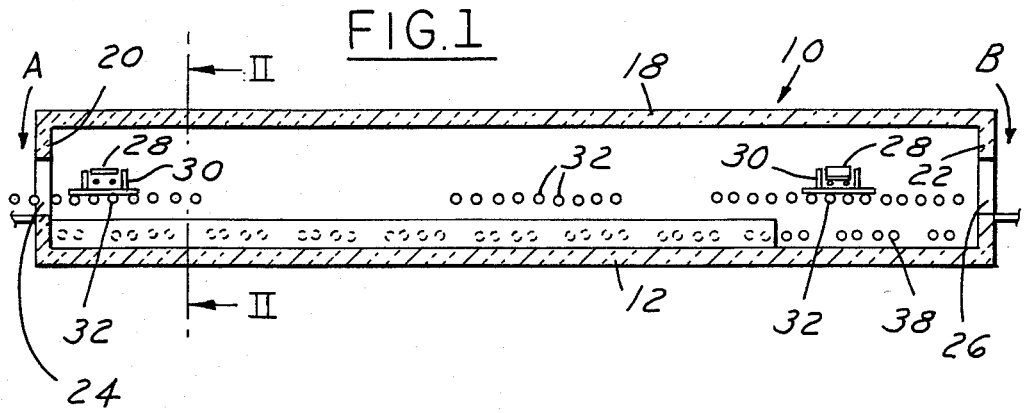
FIG. 1 is a longitudinal vertical sectional view of a glass bending furnace.

The following description is what I consider to be a preferred embodiment of an improved temperature sensing structure of my inventive construction. The following description also sets forth what I now contemplate to be the best mode of constructing my improved temperature sensing structure which finds particular utility in use in a glass bending furnace. The description is not intended to be a limitation upon the broader principles of this construction and while preferred materials are used to form the construction in accordance with the requirements of the laws it does not mean that other materials cannot be used in to make this construction.

Referring now to the drawings, a glass bending furnace 10 is shown which generally can be described as being an elongated tunnel-like heating chamber. The glass bending furnace includes a bottom wall 12, side walls 14 and 16, a top wall 18, and front and rear walls 20 and 22, respectively; all being formed of suitable heat insulating material such as refractory blocks. Adjacent an entrance end 24 of the glass bending furnace is a glass loading station A, while communicating with an exit end 26 of the glass bending furnace is a section B through which the glass sheets are conveyed after being bent.

Figure 2:
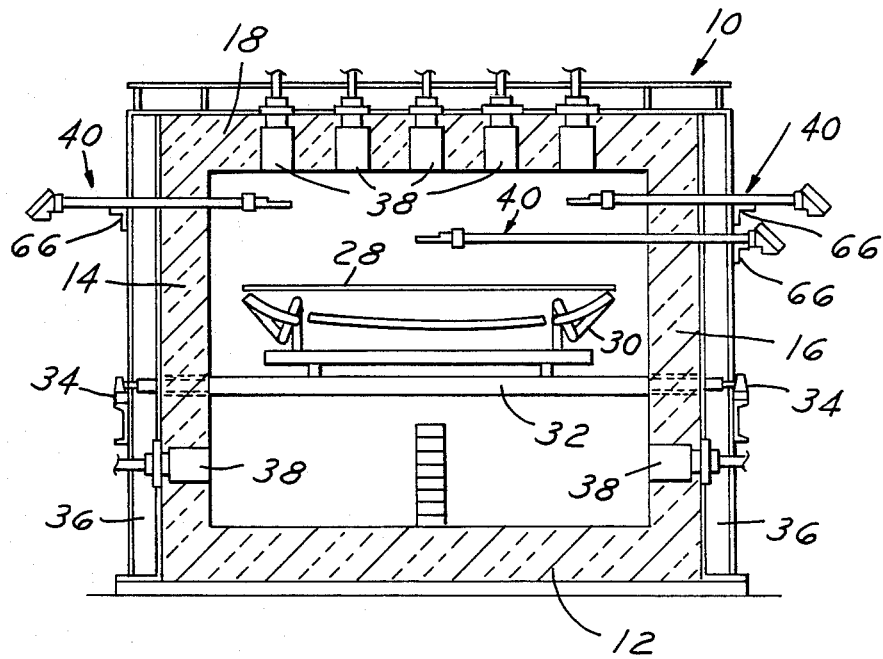
FIG. 2 is a vertical transverse sectional view of the furnace of FIG. 1 taken on line II—II of FIG. 1.

Glass sheets 28 are supported upon bending fixtures 30 which are of a design well known in the prior art, for example, of the type shown in the aforementioned U.S. Pat. No. 3,123,344. The bending fixtures are located within the glass bending furnace 10 upon a plurality of substantially horizontally disposed rolls 32—32 to support and carry the bending fixtures and the glass sheets through the glass bending furnace. As shown in FIG. 2, the opposite ends of each roll 32 are journalled in bearings 34—34 mounted on the exterior of the side walls 14 and 16 on suitable furnace framing structures 36—36 in a manner well known in the art. The rolls are driven in a manner well known in the art. A more detailed description of bending fixtures of the type used in the glass bending furnace are set forth in U.S. Pat. No. 2,893,170.

The glass bending furnace is used in the following manner. When a sheet of glass 28 is initially positioned on the bending fixture 30, the sheet of glass is in a relatively flat condition. As the glass sheets are carried forwardly through the glass bending furnace 10 from its entrance end 24 to its exit end 26, the glass sheets are heated to a softened condition. In their softened condition, the glass sheets are bent downwardly by gravity into the bending fixture. As the glass sheets become softened and sag into the bending fixture, end sections of the bending fixtures are gradually swung upwardly and inwardly and thus the sheets settle thereon until the end sections reach the closed position of the bending fixture, whereupon the sheets are bent into conformity therewith. In this manner a sheet of glass is bent in the glass bending furnace to its proper configuration. The heating of the glass to its proper temperature, so it may sag into conformity with the bending fixture upon which it is riding, is carried out by proper heating of the glass bending furnace.

In establishing a preferential heat pattern within the glass bending furnace 10 to gradually raise the temperature of the glass sheets 28 to a softened condition, heat sources such as radiant gas burners 38—38 are arranged in the top wall 18 of the glass bending furnace. Similar gas burners 38—38 may be located along and in the side walls 14 and 16 between the bottom wall 12 and the rolls 32—32.

As is well known in the art, the radiant gas burners 38—38 are arranged in the various sections of the glass bending furnace in such an array as to maintain a rising heat gradient through the first 60-70% of the glass bending furnace. As individual ones of glass sheets 28 to be bent are carried successively through the first 70% or so of the glass bending furnace 10, they will be gradually brought to the desired temperature to soften the glass and cause it to bend downwardly into conformity with the bending fixtures upon which each individual glass sheet is carried as is well known in the art. During the passage of the glass sheets through the glass bending furnace, it is desirable that the sheets be uniformly heated by the radiant gas burners 38—38.

In prior art glass bending furnaces, simple thermocouple structures have been used to detect the specific temperature within various sections or zones of the glass bending furnace. I have found that a simple thermocouple device does not give the best accuracy in detecting the temperature within various sections or zones of the glass bending furnace because of a number of reasons. The temperature read within the furnace is used to control the amount of radiant energy being supplied by a gas burner in that section or zone of the glass bending furnace by controlling, for example, in the case of radiant gas burners, the amount of gas supplied thereto. The specific manner in which thermocouples control the amount of gas supplied to a radiant gas burner is well known in the art as is evidenced by the aforementioned U.S. Pat. No. 3,123,344.

This invention is directed to an improved temperature sensing structure which finds particular utility for use in a glass bending furnace. In particular, the improved temperature sensing structure of this invention is used in a glass bending furnace having wall structures in which radiant heat generating devices pass therethrough. The radiant heat generating devices may be radiant gas burners or electrically heated elements. These radiant heat generating devices are used to generate heat for heating the interior of the glass bending furnace.

The improved temperature sensing structure of my invention is generally designated by the numeral 40 in the figures and is best seen in FIGS. 3-5. The structure includes a thermocouple element, generally identified by the numeral 42. The thermocouple element includes a pair of thermocouple leads 44-46 terminating in a junction 48. As seen in FIGS. 3 and 5, the junction end of the pair of thermocouple leads of the thermocouple element defines a loop portion which lies in the plane of the drawing of FIGS. 3 and 5. The significance of this planar loop portion of the thermocouple element will be explained in greater detail hereinbelow. A mounting structure 50 (shown in FIGS. 3 and 5) mounts the pair of thermocouple leads 44-46 with the planer loop portion of the thermocouple element 42 projecting outwardly from a free end 52 of the mounting structure. The mounting structure 50 may be formed of a ceramic material such as mullite. The thermocouple leads 44-46 may be formed of thermocouple material such as chromel 1/alumel.

The temperature sensing structure 40 includes as a principal element thereof a protection tube which is defined by an elongated portion 54 and a free end portion 56 which are interconnected by an interconnecting portion 58. In the form shown in the preferred embodiment, the elongated portion, free end portion, and interconnecting portion of the protection tube are all made from a material such as stainless steel and are formed so that they may be threaded together by pipe threads.

The elongated portion 54 of the protection tube is generally in surrounding relation to the mounting structure 50 so as to provide a device which surrounds and protects the mounting structure which in turn supports therewithin the thermocouple leads 44 and 46 of thermocouple element 42. The length of the elongated portion of the protection tube is such that the free end portion 56 of the protection tube may be located in a position generally in juxtaposition to a radiant gas burner 38 when the temperature sensing structure 40 is used in the glass bending furnace 10.

The free end portion 56 of the protection tube has a portion 60 thereof which in part surrounds a significant portion of the planar loop portion of the thermocouple element 42 as may best be seen in FIGS. 3 and 4. In best seen FIG. 3, the surrounding part 60 of the free end portion 56 of the protection tube is positioned so that the planar loop element lies in a plane in facing relationship to an unsurrounding part of the free end portion of the protection tube. In this manner the planar loop portion of the thermocouple element 42 may be located in facing relationship to an associated one of the radiant gas burners as will be described in greater detail hereinbelow.

A quartz tube 62 encloses the planar loop portion of the thermocouple element 42 as is best seen in FIGS. 3 and 4. The quartz tube may be a tube which surrounds the entire planar loop portion of the thermocouple element and may well be located within and cemented to the free end portion 56 of the protection tube. The quartz tube is generally opaque to infrared radiation wavelengths longer than about 7 microns and transparent to shorter wavelengths. By being transparent to wavelengths shorter than about 7 microns, the tube allows penetration to the thermocouple element of these shorter wavelengths. These shorter wavelengths are wavelengths generated by the radiant gas burner 38 when burning gas therein. These shorter wavelengths of infrared radiation are the wavelengths which cause a heating of the glass bending furnace.

As best seen in FIG. 2, positioning brackets 66—66 are used to position the protection tubes of various ones of the temperature sensing structures 40—40 within the glass bending furnace 10 in a manner such that each of the temperature sensing structures has its free end portion 56 thereof in juxtaposition to one of the radiant gas burners 38. In this manner an unsurrounding part of the free end portion 56 of the protection tube is in facing relationship with the radiant gas burner associated therewith whereby the planar loop portion of the thermocouple element 42, which is protected by the quartz tube 62 from above and portion 60 below, is also in facing relationship with the radiant gas burner. In this manner the planar loop portion of the thermocouple element can give an accurate reading of the radiation being given off by the radiant gas burner in facing relationship thereto. This reading is not affected by things such as air currents in the bending furnace, empty bending fixtures passing through the furnace, gaps between bending fixtures, dummy bending fixtures, radiant reflectance from glass surfaces, and varying glass and bending fixture sizes.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. In a glass bending furnace having wall structures in which radiant heat generating devices passing therethrough are used to generate heat for heating the interior of the glass bending furnace, an improved temperature sensing structure which comprises:

a thermocouple element, said thermocouple element having a pair of thermocouple leads terminating in a junction end which defines a planar loop portion of said thermocouple element;

mounting means for mounting said pair of thermocouple leads with said planar loop portion of said thermocouple element projecting outwardly from a free end of said mounting structure;

a radiation reflective, heat shielding protection tube having (1) an elongated portion in surrounding relationship to said mounting means which mounts said pair of thermocouple leads, and (2) a free end portion which surrounds all but a facing portion of said planar loop portion of said thermocouple, said surrounding part of said free end portion of said protection tube being positioned so that said facing planar loop portion of said thermocouple element lies in a plane in facing relationship to an unsurrounding part of said free end portion of said protection tube;

quartz tube means for enclosing said planar loop portion of said thermocouple element; said quartz tube means being generally opaque to infrared wavelengths longer than about 7 microns and transparent to shorter wavelengths;

means for positioning said protection tube in a wall structure of the glass bending furnace so that said unsurrounding part of said free end portion of said protection tube is in facing relationship with a radiant heat generating device passing through a wall structure of the glass bending structure, whereby said planar portion of said thermocouple element, which is protected by said quartz tube means can give an accurate reading of the radiation being given off by the radiant heat generating device in facing relationship thereto.

2. The improved temperature sensing structure of claim 1, wherein said quartz tube means completely encloses said planar loop portion of said thermocouple element.

3. The improved temperature sensing structure of claim 1, wherein said protection tube is made of stainless steel.

* * * * *